United States Patent [19]
Armstrong

[11] 4,291,407
[45] Sep. 22, 1981

[54] PARITY PREDICTION CIRCUITRY FOR A MULTIFUNCTION REGISTER

[75] Inventor: Rolfe D. Armstrong, Escondido, Calif.

[73] Assignee: NCR Corporation, Dayton, Ohio

[21] Appl. No.: 74,036

[22] Filed: Sep. 10, 1979

[51] Int. Cl.³ .......................................... G06F 11/10
[52] U.S. Cl. .................................... 371/49; 364/738
[58] Field of Search .......................... 371/49; 364/738

[56] References Cited
U.S. PATENT DOCUMENTS

| | | | |
|---|---|---|---|
| 3,567,916 | 3/1971 | Fullton, Jr. | 371/49 |
| 3,732,407 | 5/1973 | Brewster et al. | 364/738 |
| 3,911,261 | 9/1974 | Taylor | 371/49 |

*Primary Examiner*—David H. Malzahn
*Attorney, Agent, or Firm*—J. T. Cavender; Edward Dugas; Stephen F. Jewett

[57] ABSTRACT

Parity prediction circuitry for use with a multifunction register. The parity prediction circuitry includes a parity prediction circuit associated with each function of the register. A selecting multiplexer selects the parity prediction circuit that will provide a predicted parity bit at the output of the parity prediction circuitry, with the selection controlled by the same control signals that select the function of the register. The parity prediction circuits associated with COUNT UP and COUNT DOWN functions also include a multiplexer, with this multiplexer having data inputs connected in a predetermined fashion to signals having a value of either logic level "1" or logic level "0". This multiplexer has control inputs connected to the data outputs of the register and has a data output selected by the control inputs in order to provide a signal indicating whether the predicted parity is to change from the previous predicted parity.

11 Claims, 10 Drawing Figures

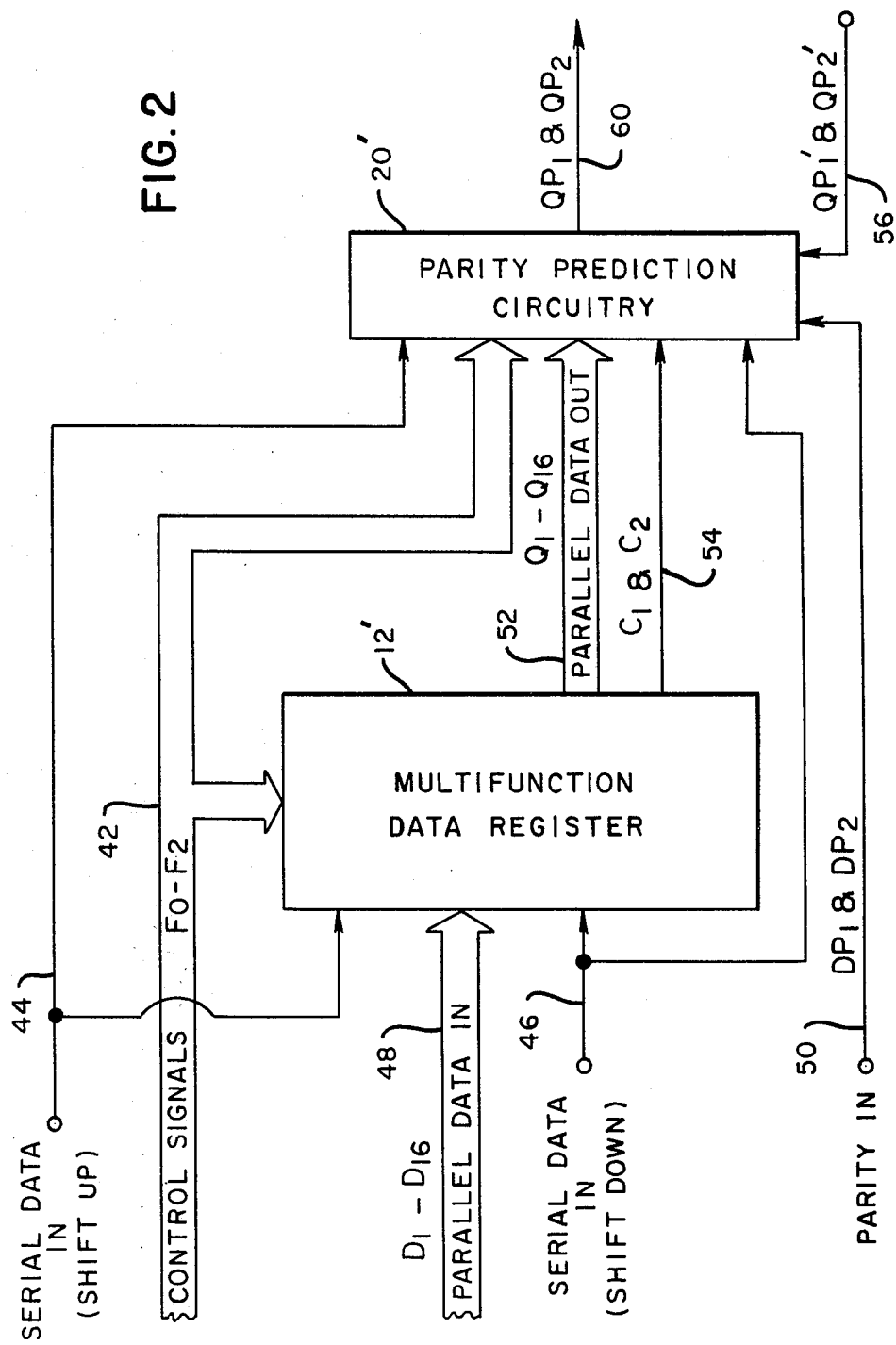

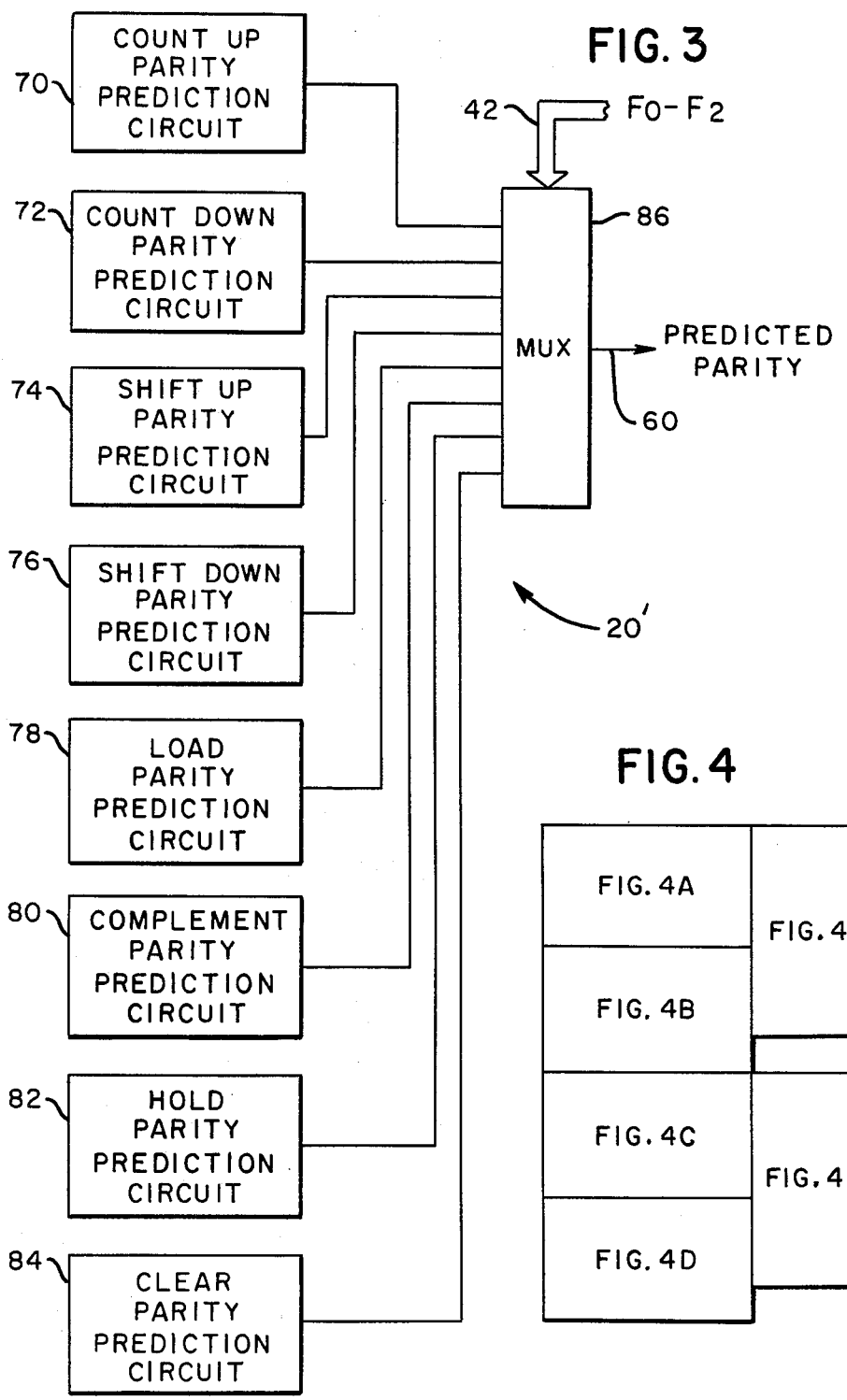

PARITY PREDICTION CIRCUITRY FOR A MULTIFUNCTION REGISTER

BACKGROUND OF THE INVENTION

The present invention relates generally to data processing systems, and more particularly, to circuitry for predicting the parity of data within a register in a data processing system.

During the operation of a data processing system, it is often desirable to check data for any processing or transmission errors. One of the most frequently used ways of checking for errors in data is by the use of parity bits. A parity bit is a bit that is transmitted along with an associated data word and indicates the parity of its associated data word, i.e., whether it has an even or an odd number of ones. When a data word reaches its destination along with its parity bit, the parity of the data word is again calculated and compared to the transmitted parity bit. If they are different, an error is known to have occurred somewhere during the transmission of the data word.

Within a data processor, it is also often desirable to check parity each time a data word is passed through a register that may, in response to some control signal, purposely alter the data word. In such a circumstance, a parity check is made by predicting what the parity of the data word will be after it is altered by the register, and then calculating the actual parity on the new data word and making a comparison of the predicted and actual parities.

Circuits for predicting parity are known in the art, with the following being representative patents:

Miller—U.S. Pat. No. 4,079,457
Cowan—U.S. Pat. No. 3,758,760
Reinheimer—U.S. Pat. No. 3,699,323
Keller—et al. U.S. Pat. No. 3,649,817
Fullton, Jr.—U.S. Pat. No. 3,567,916
Toy—U.S. Pat. No. 3,555,255
Cheney—U.S. Pat. No. 3,192,362
Sakalay—U.S. Pat. No. 3,141,962

In the above mentioned Fullton, Jr. patent, there are disclosed circuits that predict and check parity for a data word in a binary counter and in a shift register. One difficulty with parity prediction circuits, such as those shown in the Fullton, Jr. patent, is that in integrated circuit chips that involve high density gates, such as chips manufactured using emitter-coupled logic (ECL) technology, a register fabricated on the chip can perform a number of different functions with respect to the data stored in the register. For example, in the four stage counter/shift register circuit number F100136, commercially available from Fairchild Camera and Instrument Corporation, Mountain View, California, there are provided control inputs which enable the circuit to perform any one of eight different functions (LOAD, SHIFT DOWN, SHIFT UP, COUNT DOWN, COUNT UP, HOLD, COMPLEMENT and CLEAR). A register circuit of this type and having these functions is now in use or is contemplated for use in many data processing systems. The parity prediction circuits disclosed in the Fullton, Jr. patent, however, are not useable with such a register circuit, since the Fullton, Jr. patent only shows registers having single functions and parity prediction circuits used only in connection with the single functions.

Furthermore, the parity prediction circuits now known frequently involve the use of many gates for receiving the data outputs of their associated registers, such gates being necessary in order to accurately predict the parity which may result from an operation performed by the register. A circuit having more than one function would be made extremely complex and would have a large number of gates if the known circuitry, such as disclosed in the Fullton, Jr. patent, were used to predict parity.

SUMMARY OF THE INVENTION

In accordance with the present invention, there is provided circuitry for predicting the parity of data stored in a multifunction register. The parity prediction circuitry includes a parity prediction circuit associated with each function for predicting the parity of the data stored in the register when that function is performed. The parity prediction circuitry further includes selecting means, such as a multiplexer, for receiving the same control signals that are also provided to the register for determining which function is to be performed, and for causing the predicted parity to appear at its output in response to the control signals.

More specifically, there is provided in accordance with the present invention circuitry for predicting parity for data stored in a register, the register having the functions of COUNT UP, COUNT DOWN, SHIFT UP, SHIFT DOWN, LOAD, COMPLEMENT, HOLD and CLEAR. To avoid extensive and complex logic gate circuitry associated with the prediction of parity bits, the prediction of the parity resulting from a COUNT UP or a COUNT DOWN function includes a multiplexer having its control inputs connected to the data outputs of the register and having its data inputs connected in a predetermined fashion to signals either at a logic level "1" or logic level "0". In response to each value appearing at the register data outputs, the multiplexer provides a parity predicting or changing signal at its output.

Various other parity prediction circuits are associated with each of the other register functions and have their outputs selectively connected, along with the output of the COUNT UP and COUNT DOWN parity prediction circuits, to the output of the parity predicting circuitry by a selecting multiplexer. The selecting multiplexer receives at its control inputs the same control signals that control the function performed by the register.

It is, therefore, an object of the present invention to provide an improved multifunction register, including means for predicting the parity of data resulting from the register performing any of multiple functions.

Another object of the present invention is to provide circuitry for predicting the parity of data in a register without requiring a large number of logic gates.

Still another object of the present invention is to provide parity prediction circuitry for a multifunction register, such register including the functions of COUNT UP, COUNT DOWN, SHIFT UP, SHIFT DOWN, LOAD, COMPLEMENT, HOLD and CLEAR.

It is still another object of the present invention to provide circuitry for predicting parity of data in a multifunction register, such parity prediction circuitry determining predicted parity in response to the same control signals that control the function of the register.

It is yet another object of the present invention is to provide a multifunction register in a data processing system where the data in the register may be altered during the performance of any of the register functions, and to provide circuitry to check the data so altered for errors by comparing predicted parity and actual parity.

These and other objects will become more apparent when taken in conjunction with the following description and the attached drawings.

BRIEF DESCRIPTION OF THE DRAWINGS

FIG. 2 is a block diagram illustrating in detail the inputs and outputs of a multifunction register and parity prediction circuitry in accordance with the present invention.

FIG. 3 is a simplified block diagram illustrating eight parity prediction circuits in the parity prediction circuitry of FIG. 2.

FIG. 4 illustrates the relation of FIGS. 4A through 4F.

DETAILED DESCRIPTION OF THE PREFERRED EMBODIMENT

Figure 1:
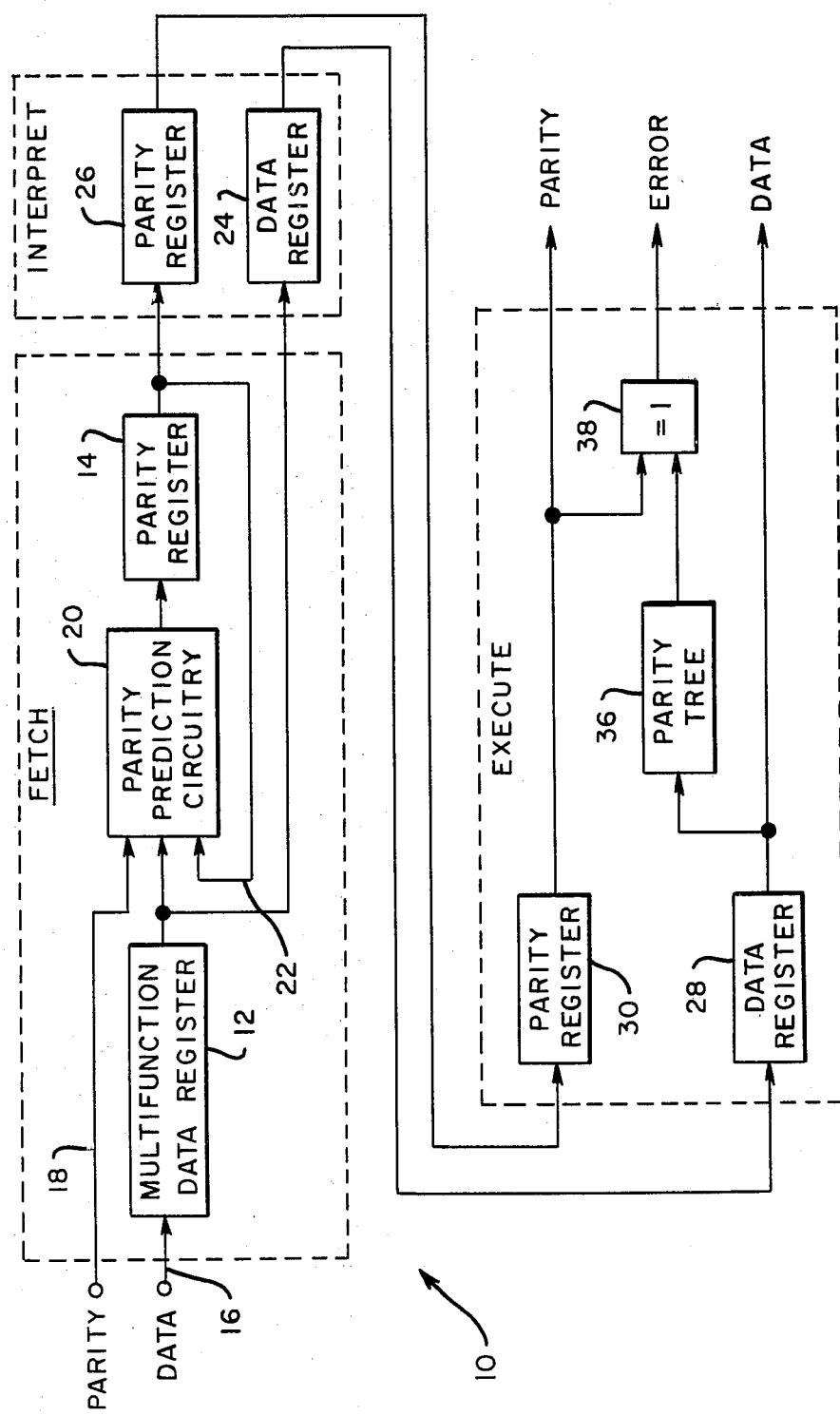
FIG. 1 is a simplified block diagram illustrating a multifunction register and parity prediction circuitry in a data processor in accordance with the present invention.

Referring now to FIG. 1, there is shown in simplified form portions of three stages of a processor 10. The three illustrated stages are labeled "FETCH", "INTERPRET", and "EXECUTE". There is associated with each stage of the processor 10 a register for storing data and a register for storing parity bits associated with the data. Accordingly, in FIG. 1 there is a multifunction data register 12 and a parity register 14 in the FETCH stage. The multifunction data register 12 is, for example, a 16-bit register that can perform a plurality of functions or operations. The plurality of functions would commonly include, for example, COUNT UP (incrementing as a binary counter), and LOAD (loading parallel bits of a data or address word). The register 12 may additionally have functions such as SHIFT UP or SHIFT DOWN (i.e., serially shifting data in either direction through the register), COUNT DOWN (decrementing), CLEAR (clearing the register), COMPLEMENT (complementing the bits in the registers), or HOLD (simply holding the bits in the register without altering them).

Each of the functions described above would normally be performed in response to control signals or bits received by control inputs (not shown in FIG. 1) of register 12. The data bits to be stored in the register 12 are illustrated in FIG. 1 as received by a data input line 16, and the parity bits, one parity bit associated with each byte of data received on the input line 16, are illustrated as received on a parity input line 18. For purposes of describing FIG. 1, it will be assumed that register 12 stores one byte of data, although it should be appreciated that in actual practice register 12 can store any number of bytes.

The output of the register 12 is provided to parity prediction circuitry 20 along with the parity bit received on the parity input line 18. The parity prediction circuitry 20 will be described in greater detail later. However, briefly, its purpose is to predict the parity of data resulting from any of the functions performed by register 12. Parity prediction circuitry 20 receives, in addition to the output of the register 12 and the parity bit on the parity input line 18, the same control signals (not shown) that are delivered to the register 12 and receives a parity bit over a line 22 from parity register 14 representing the previous predicted parity of the data before altered by the register 12. In response to these signals, parity prediction circuitry 20 provides to parity register 14 a bit that represents the new predicted parity of the data within the register 12. The predicted parity is generated at about the same time that the function is performed by register 12.

There are also shown in FIG. 1 a data register 24 and a parity register 26 associated with the INTERPRET stage of the processor, and a data register 28 and a parity register 30 associated with the EXECUTE stage of the processor. It should be appreciated that FIG. 1 shows only registers associated with each of the illustrated stages, and that there would, of course, be other components within each stage. For example, in the INTERPRET stage there would typically be control logic for decoding commands or instructions and in the EXECUTE stage there would be an arithmetic logic unit (ALU) for operating on data.

It should also be appreciated that for purposes of the present invention the actual construction of the processor 10 is unimportant and that the multifunction data register 12 and parity prediction circuit 20 could be used other than as shown in processor 10 of FIG. 1.

As mentioned above, the basic purpose of the parity prediction circuitry 20 is to predict the parity of data after altered in accordance with any function performed by register 12. The predicted parity can then be compared to the actual parity of the data in the register in order to determine if an error has occurred. If there is an error, then the processor can, for example, be made to repeat the register operation in order to correct the error.

Accordingly, during each operation of the register 12, the parity prediction circuitry 20 generates a predicted parity bit which is stored in the parity register 14. The data in register 12 and its associated predicted parity bit in parity register 14 are passed through the data register 24 and parity register 26, respectively, of the INTERPRET stage, and then through the data register 28 and parity register 30, respectively, of the EXECUTE stage. While in the EXECUTE stage, the data is passed through a parity tree 36 which computes the actual parity of the data from data register 28. Circuitry for implementing a parity tree 36 is well-known and has been described in many publications, including a patent referenced in the aforementioned Fullton, Jr. patent. The predicted parity received from parity register 30 and the actual parity computed within the parity tree 36 are then compared in an EXCLUSIVE OR gate 38, and if a "1" appears at the output of gate 38 (indicating the predicted and actual parities do not match), an error or fault condition is known to exist.

In FIG. 2, there is illustrated in detail the various signals at the inputs and outputs of a multifunction data register 12' and a parity prediction circuitry 20'. The multifunction register 12' and parity prediction circuit 20' are analagous to the multifunction register 12 and parity prediction circuitry 20 of FIG. 1. However, for purposes of describing FIG. 2, it is assumed that the register 12' is a sixteen-stage, eight-function register, having the functions of COUNT UP, COUNT DOWN, SHIFT UP, SHIFT DOWN, LOAD, COMPLEMENT, HOLD and CLEAR.

As illustrated in FIG. 2, the register 12' has control input lines 42 for receiving three control signals $F_0$-$F_2$ that indicate the type of function to be performed by register 12'. Register 12' also has a serial data input line 44 for receiving and serially shifting data through the register from the first stage to the last stage (SHIFT UP), a serial data input line 46 for receiving and serially shifting data through the register from the last stage to the first stage (SHIFT DOWN), and parallel data input lines 48 for use in parallel loading the register 12' with sixteen bits $D_1$-$D_{16}$.

The signals on the lines 42, 44 and 46 are also received by the parity prediction circuitry 20'. In addition, the parity prediction circuitry 20' receives two parity bits $DP_1$ and $DP_2$ from a parity input line 50 representing the parity of the two bytes of data loaded into register 12' on lines 48, data output bits $Q_1$-$Q_{16}$ from parallel data output lines 52 of register 12', a carry bit $C_1$ associated with the data output bits $Q_1$-$Q_8$ and a carry bit $C_2$ associated with data output bits $Q_9$-$Q_{16}$ on the carry output line 54 of register 12', and parity bits $QP_1'$ and $QP_2'$ on a line 56 representing the previously predicted parity of the data in the register 12'. The line 56 in FIG. 2 corresponds to line 22 in FIG. 1, and the parity bits on line 56 correspond to the previous predicted parity of the data from the output of register 14 in FIG. 1. As a result of all the signals shown in FIG. 2 and described herein, two new predicted parity bits $QP_1$ and $QP_2$, each associated with eight bits stored in register 12, appear on an output line 60 of the parity prediction circuitry 20'.

One notable feature of the parity prediction circuitry 20' is its ability to predict parity for data stored in register 12' for each function of the register 12' and doing so at the same time that the register operation in accordance with the function is being performed. This is made possible by the receipt of the control signals $F_0$, $F_1$ and $F_2$ by parity prediction circuitry 20' at the same time that they are received by register 12'. As will be described in greater detail later, the control signals $F_0$-$F_2$ control the selection of the parity bits that will appear at the output of parity prediction circuitry 20'.

Turning now to FIG. 3, there is illustrated diagrammatically by a simplified block diagram eight parity prediction circuits that would be found in the parity prediction circuit 20' of FIG. 2, each parity prediction circuit associated with one of the eight functions performed by register 12'. Specifically, there is a count up parity prediction circuit 70 for predicting parity when the register 12' is performing a count up function. There is a count down parity prediction circuit 72 for predicting parity when register 12' counts down. A shift up parity prediction circuit 74 and a shift down parity prediction circuit 76 will give parity predictions when the register 12' serially shifts up and serially shifts down, respectively. There are also a load parity prediction circuit 78, a complement parity prediction circuit 80, a hold parity prediction circuit 82, and a clear parity prediction circuit 84, each predicting parity for its respective function.

The output of each of the parity prediction circuits 70 through 84 are presented to the inputs of a selecting multiplexer (MUX) 86 that selects which of the parity prediction circuits is to have its predicted parity presented at the output line 60 of the parity prediction circuitry 20'. The selection made by MUX 86 is controlled by the control signals $F_0$-$F_2$ received on previously mentioned control lines 42. These control signals are, as also previously mentioned, the same control signals that determine the function to be performed by register 12'.

FIG. 3, as described above, thus illustrates the basic operation of the parity prediction circuitry 20'. That is, the parity prediction circuitry 20' includes a circuit associated with each function performed by register 12'. The control signals presented to register 12' are also presented to MUX 86 of the parity prediction circuitry 20' and determine which of the parity prediction circuits 70 through 84 will be used to predict the parity for the data in register 12'.

Turning now to FIGS. 4A through 4F, there is illustrated specific circuitry for implementing the multifunction register 12' and parity prediction circuitry 20' of FIGS. 2 and 3. The relation of FIGS. 4A, 4B, 4C, 4D, 4E and 4F is shown in FIG. 4.

As seen in FIGS. 4A, 4B, 4C and 4D, register 12' is comprised of four, 4-bit registers 102, 104, 106 and 108. Each of these registers is a four stage counter/shift register, such as the Fairchild circuit number 100136 described earlier, and the four registers are cascaded in a well-known manner to form a 16-bit shift register. Each register 102 through 108 has three control signal inputs $S_0$, $S_1$ and $S_2$, for receiving the three control signals $F_0$, $F_1$ and $F_2$ that determine the function in accordance with which the registers are to operate. Each of the registers further includes four parallel data inputs and four parallel data outputs so that the combined registers receive and store sixteen data input bits D1 through D16 and provide sixteen data output bits $Q_1$ through $Q_{16}$. Each of the registers 102, 104, 106 and 108 includes two other inputs, a serial data shift up input CET and a serial data shift down input D. The input CET on register 102 receives from the serial data input line 44 a data bit SHIFTINUP to be shifted into the combined registers during the SHIFT UP function and the input D on register 108 receives from the serial data input line 46 a data bit SHIFTINDWN to be shifted into the combined registers during the SHIFT DOWN function. Each of the registers also has a carry output TC for providing a carry generated during shifting or counting within its associated register.

In order to summarize the operation of registers 102, 104, 106 and 108, and the prediction of parity for the data in the registers, Table I shows values for control signals $F_0$, $F_1$ and $F_2$, the name of the function performed by registers 102, 104, 106 and 108 in response to the control signals, and a description of how the predicted parity can be calculated for the data in the register when operating in accordance with each function. In Table I, $QP_1$ is the predicted parity bit for the byte comprised of data bits $Q_1$ through $Q_8$, and $QP_2$ is the predicted parity bit for the byte comprised of data bits $Q_9$ through $Q_{16}$.

TABLE I

| $F_0$ | $F_1$ | $F_2$ | FUNCTION | PREDICTED PARITY ($QP_1$, $QP_2$) |
|---|---|---|---|---|
| 0 | 0 | 0 | LOAD | PREDICTED PARITY ($QP_1$ and $QP_2$) IS THE PARITY OF DATA BEING LOADED |
| 0 | 1 | 0 | SHIFT DOWN | PREDICTED PARITY ($QP_1$ and $QP_2$) IS |

TABLE I-continued

| F₀ | F₁ | F₂ | FUNCTION | PREDICTED PARITY (QP₁, QP₂) |
|---|---|---|---|---|
| | | | | THE SAME AS PREVIOUS PARITY IF BIT SHIFTED OUT IS THE SAME AS BIT SHIFTED IN; PREDICTED PARITY IS PREVIOUS PARITY INVERTED IF BIT SHIFTED OUT IS NOT THE SAME AS BIT SHIFTED IN |
| 1 | 1 | 0 | SHIFT UP | SAME AS SHIFT DOWN |
| 0 | 1 | 1 | COUNT UP | QP₁ IS PREVIOUS PARITY INVERTED IF Q₁ THROUGH Q₈ HAVE AN EVEN NUMBER OF LEADING 1'S; QP₁ IS THE SAME AS PREVIOUS PARITY IF Q₁ THROUGH Q₈ HAVE AN ODD NUMBER OF LEADING 1'S QP₂ IS PREVIOUS PARITY INVERTED IF Q₁ THROUGH Q₈ ARE ALL 1'S AND Q₉ THROUGH Q₁₆ HAVE AN EVEN NUMBER OF LEADING 1'S; OTHERWISE QP₂ IS THE SAME AS PREVIOUS PARITY |
| 0 | 0 | 1 | COUNT DOWN | QP₁ IS PREVIOUS PARITY INVERTED IF Q₁ THROUGH Q₈ HAVE AN EVEN NUMBER OF LEADING 0'S; QP₁ IS THE SAME AS PREVIOUS PARITY IF Q₁ THROUGH Q₈ HAVE AN ODD NUMBER OF LEADING 0'S QP₂ IS PREVIOUS PARITY INVERTED IF Q₁ THROUGH Q₈ ARE ALL 0'S AND Q₉ THROUGH Q₁₆ HAVE AN EVEN NUMBER OF LEADING 0'S; OTHERWISE QP₂ IS THE SAME AS PREVIOUS PARITY |
| 1 | 1 | 1 | HOLD | PREDICTED PARITY IS THE SAME AS PREVIOUS PARITY |
| 1 | 0 | 0 | COMPLEMENT | PREDICTED PARITY IS THE SAME AS PREVIOUS PARITY |
| 1 | 0 | 1 | CLEAR | PREDICTED PARITY IS "1" |

The number of leading "1's" or "0's" referred to in the COUNT UP and COUNT DOWN functions in Table I is the number of consecutive "1's" or "0's" beginning with the lowest order bit. Also, the predicted parity given in Table I and the parity used in the disclosed embodiment is odd parity. For even parity, the value of the parity would be the opposite value of that indicated.

Under each of the headings to follow, there is described in greater detail the calculation of the predicted parity summarized in Table I and the parity prediction circuits associated with each of the functions of the registers 102, 104, 106 and 108 shown in FIGS. 4A through 4D.

COUNT UP & COUNT DOWN FUNCTIONS

The circuitry associated with the COUNT UP and COUNT DOWN functions is shown enclosed by broken lines 118 in FIGS. 4A through 4F and corresponds to the count up and count down parity prediction circuits 70 and 72 illustrated in FIG. 3. Four multiplexers (MUX's) 110, 112, 114 and 116 are associated with the registers 102, 104, 106 and 108, respectively, and each may be implemented by a sixteen-input multiplexer, circuit number 100164, available from Fairchild Camera and Instrument Corporation.

Each of the MUX's 110 through 116 includes four control inputs, $S_0$, $S_1$, $S_2$ and $S_3$ that receive the four parallel data outputs of its associated register. Each of the MUX's further include sixteen data inputs, designated $I_0$ through $I_{15}$, with one of the data inputs selectively provided to the multiplexer data output Z in response to the control signals at the control inputs $S_0$, $S_1$, $S_2$ and $S_3$.

In addition to the MUX's 110 through 116, the parity prediction circuits for the COUNT UP and COUNT DOWN functions within broken lines 118 include an OR gate 120 for receiving the control signal $F_1$ and having a noninverted output for providing a bit CU and an inverted output for providing a bit CD. Further included within broken lines 118 are AND gates 122, 124, 126 and 128, with each receiving at one input either the bit CU or the bit CD. The AND gates 122 and 124 each receive at a second input the output of MUX 112. The AND gates 126 and 128 each receive at a second input the bit at the TC output of register 104 and at a third input the output of MUX 116.

Figure 4A:
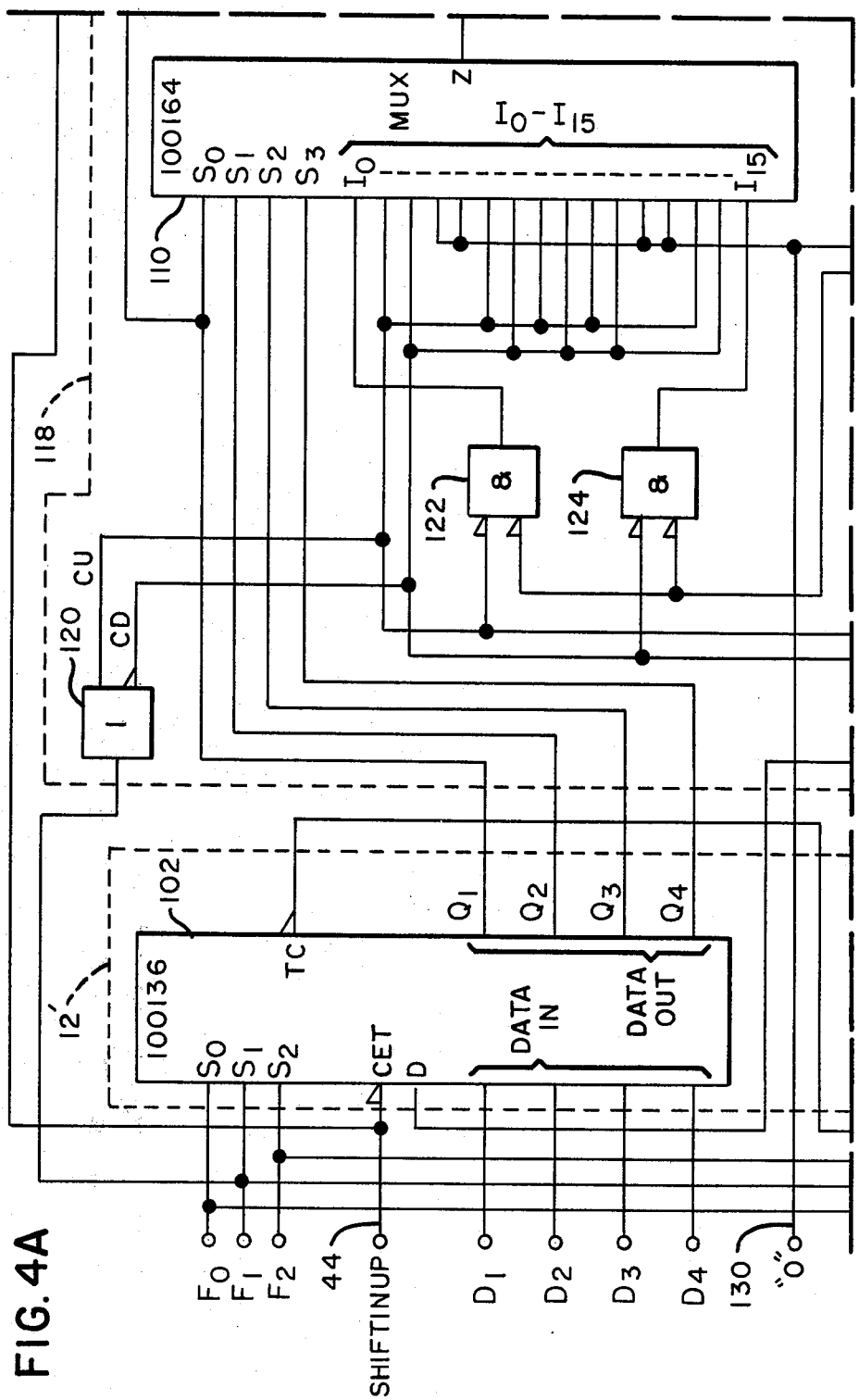
FIGS. 4A through 4F are a detailed block diagram of the multifunction register and parity prediction circuitry of FIG. 2.
Figure 4B:
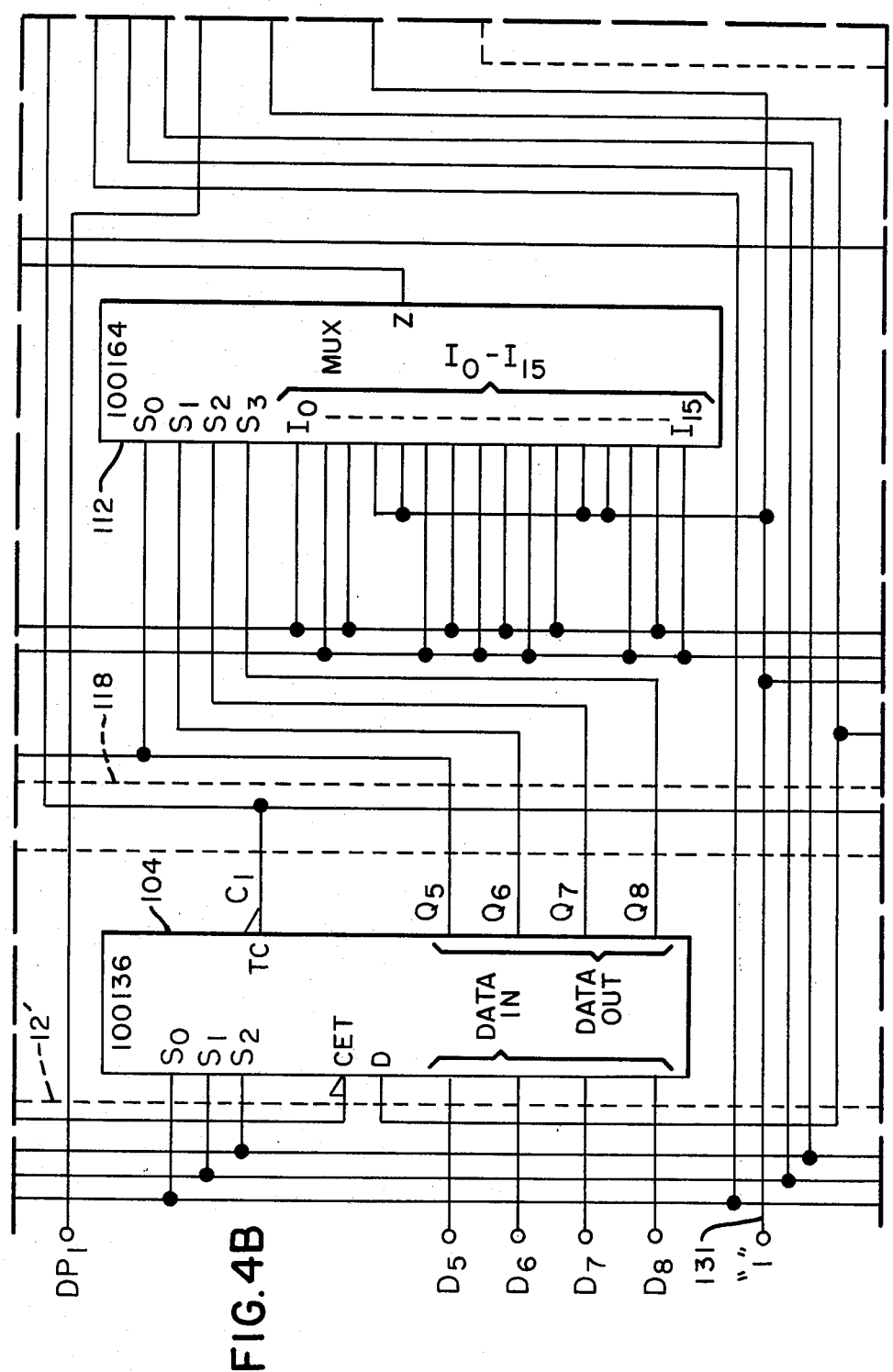
Figure 4C:
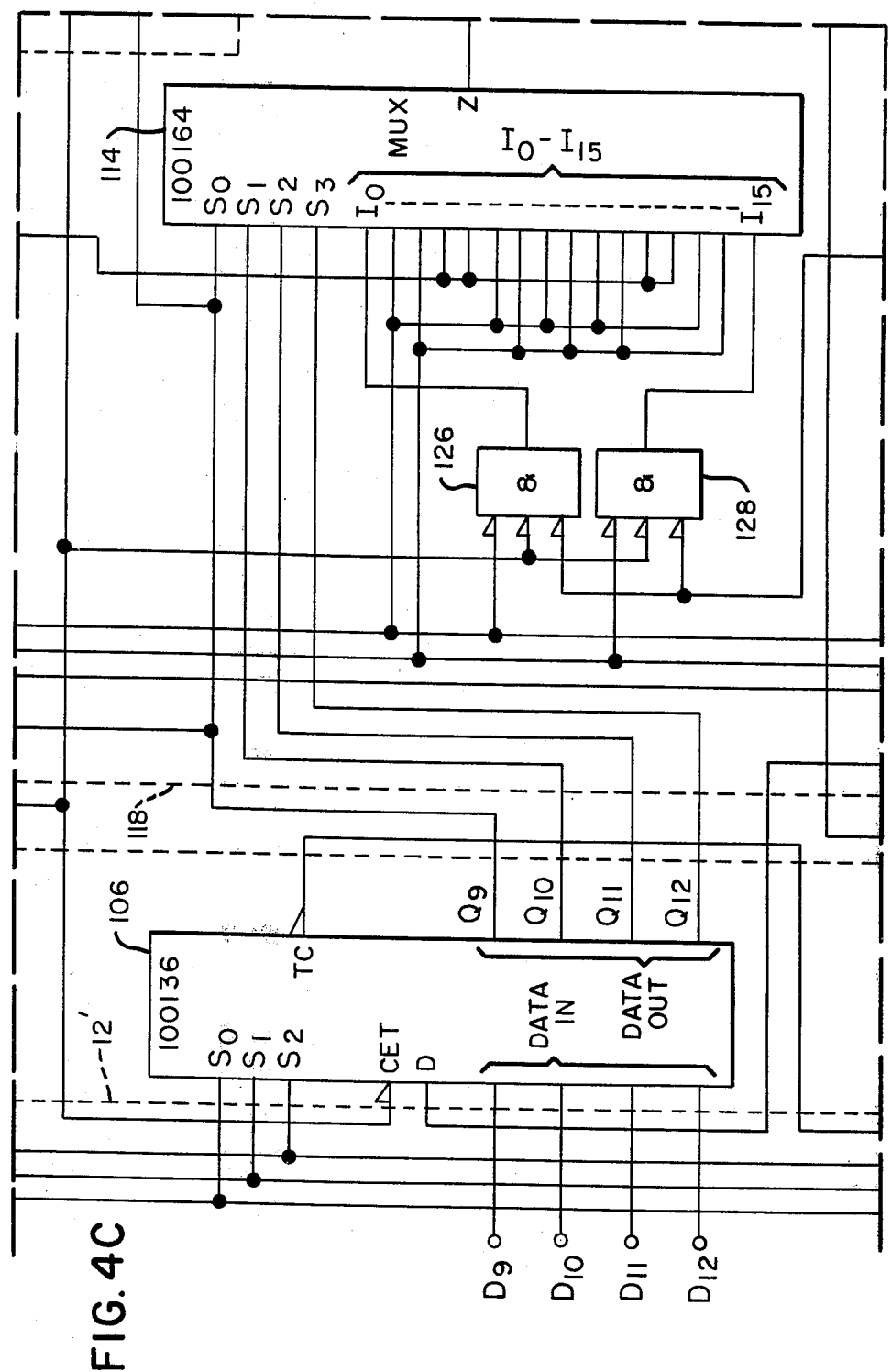
Figure 4D:
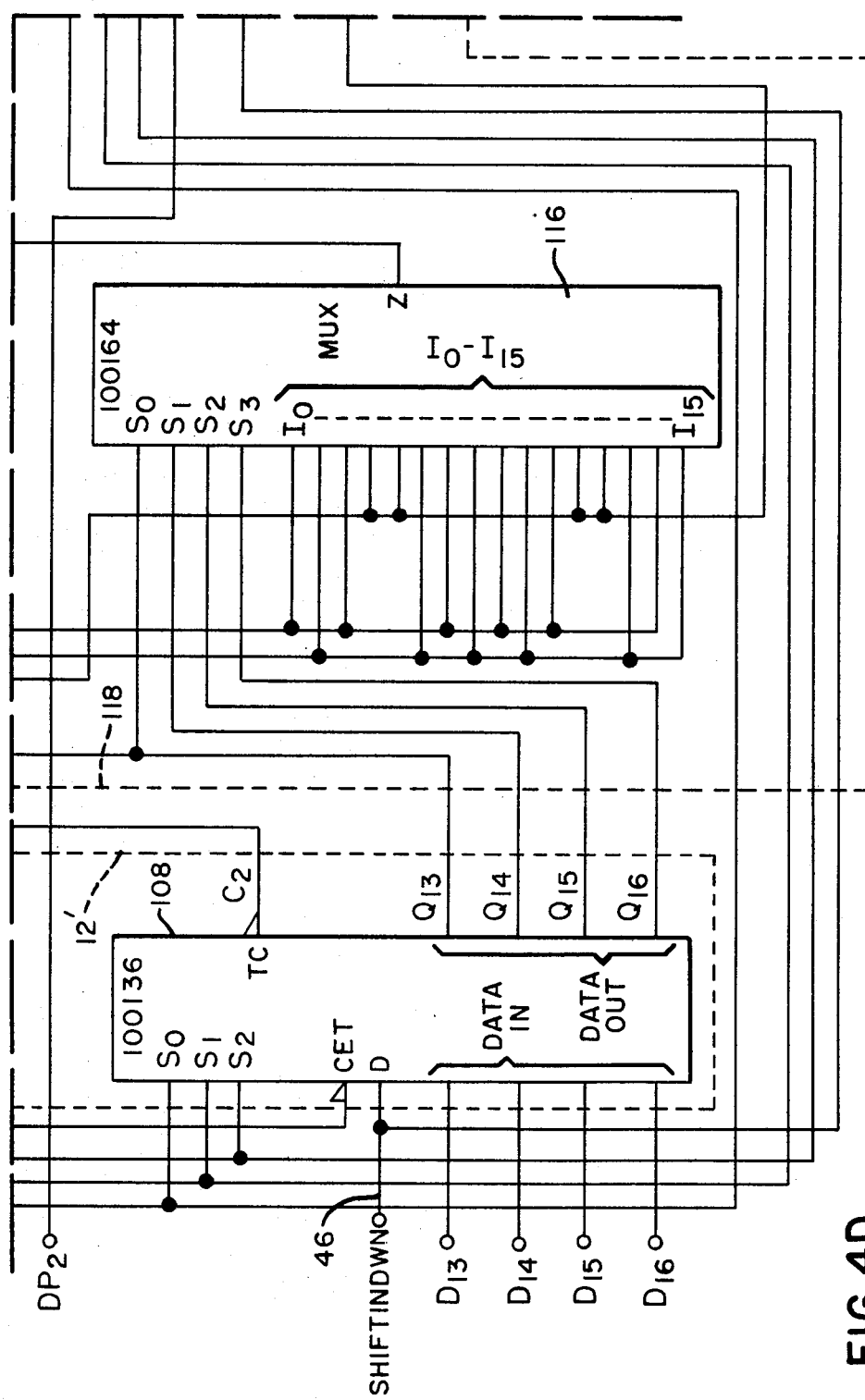
Figure 4E:
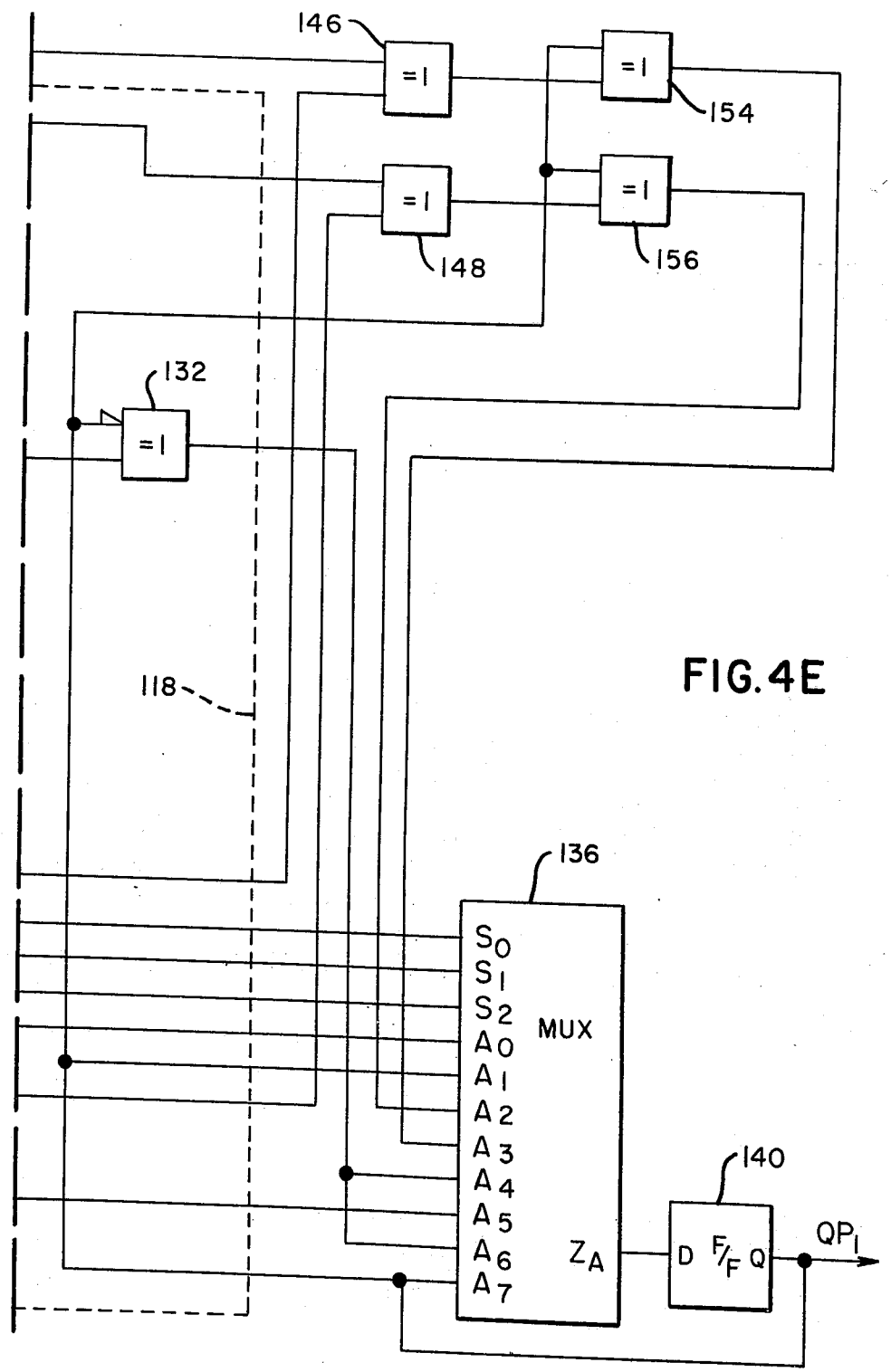
Figure 4F:
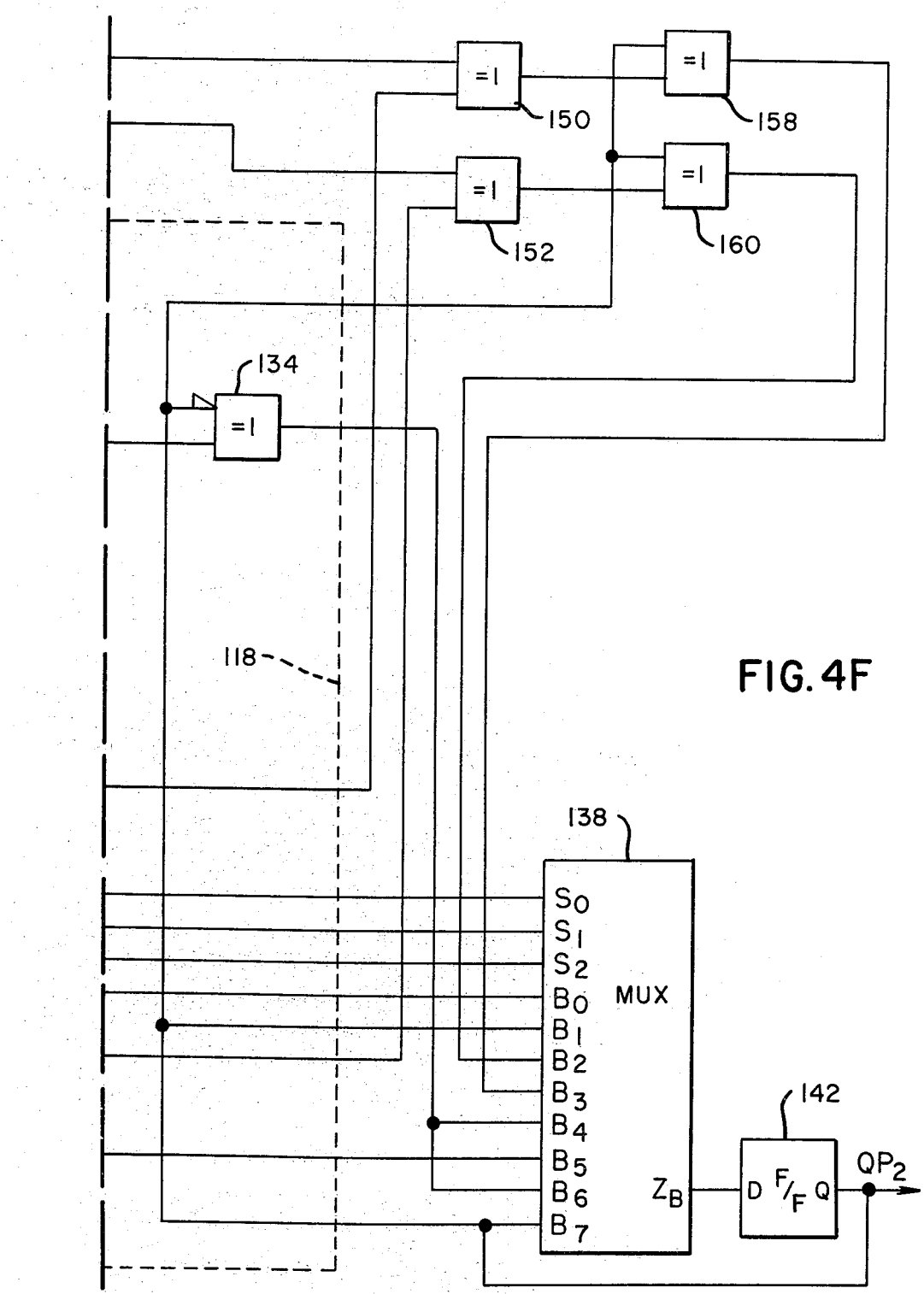

As shown in FIGS. 4A through 4D, some of the data inputs $I_0$ through $I_{15}$ of each of the MUX's 110, 112, 114 and 116 are connected directly to the inverted or noninverted outputs of OR gate 120 or indirectly to the outputs of OR gate 120 through one of the AND gates 122, 124, 126 or 128. In addition, the inputs $I_3$, $I_4$, $I_{11}$ and $I_{12}$ of MUX's 110 and 114 are connected to a voltage supply line 130 at a logic level "0" (FIG. 4A) and the inputs $I_3$, $I_4$, $I_{11}$ and $I_{12}$ of MUX's 112 and 116 are connected to a voltage supply line 131 at a logic level "1" (FIG. 4F).

The MUX 110 provides at its output Z a signal indicating whether the parity predicted in response to a COUNT UP or COUNT DOWN function will change from the previously parity predicted for the first eight bits $Q_1$ through $Q_8$ at the data outputs of registers 102 and 104. The MUX 114 provides at its output Z an indication of whether the predicted parity will change from the previously predicted parity for the last eight bits $Q_9$ through $Q_{16}$ at the data outputs of registers 106 and 108.

The MUX's 112 and 116 do not directly provide signals changing or affecting the predicted parity. Rather, these multiplexers provide their outputs to MUX's 110 and 114, respectively. MUX 112 provides its output by way of the gate 122 to the $I_0$ input of MUX 110 and by way of gate 124 to the $I_{15}$ input of MUX 110. Similarly, MUX 116 provides its output by way of gate 126 to the $I_0$ input of MUX 114 and by way of gate 128 to the $I_{15}$ input of MUX 114. As should be apparent, and as will be illustrated later by Table IIA, MUX 112 only affects the outut of MUX 110 if $Q_1$, $Q_2$, $Q_3$ and $Q_4$ are all 0's or all 1's. Likewise, MUX 116 only affects the output of MUX 114 if $Q_9$, $Q_{10}$, $Q_{11}$ and $Q_{12}$ are all 0's or all 1's. This is due, of course, to the fact that when the registers are counting up or down, higher order bits ($Q_5$, $Q_6$, $Q_7$, $Q_8$ or $Q_{13}$, $Q_{14}$, $Q_{15}$, $Q_{16}$) change and affect parity during the COUNT UP function only if the lower order bits ($Q_1$, $Q_2$, $Q_3$, $Q_4$ or $Q_9$, $Q_{10}$, $Q_{11}$, $Q_{12}$) are all 1's and change and affect parity during the COUNT DOWN function only if the lower order bits are all 0's.

The output of MUX 110 is provided to an EXCLUSIVE NOR gate 132 along with the previous predicted parity bit from the output of a flip-flop 140 and the output of MUX 114 is provided to an EXCLUSIVE NOR gate 134 along with the previous predicted parity bit from the output of a flip-flop 142.

The outputs of gates 132 and 134 are the new predicted parity bits for the COUNT UP and COUNT DOWN functions, and these predicted parity bits are presented, along with the predicted parity bits for any of the other register functions, to one of the data inputs $A_0$ through $A_7$ of a multiplexer (MUX) 136 and to one of the data inputs $B_0$ through $B_7$ of a multiplexer (MUX) 138. Together, the MUX's 136 and 138 may be implemented by a dual, eight-input multiplexer, circuit number 100163, available from Fairchild Camera and Instrument Corporation.

The MUX 136 and MUX 138 each receive the control signals $F_0$, $F_1$ and $F_2$ at their control inputs $S_0$, $S_1$ and $S_2$. MUX 136 selectively passes one bit at its data inputs to its data output $Z_A$, and from there to the flip-flop 140. The flip-flop 140 then stores and provides at its output the predicted parity bit $QP_1$ for the first eight data bits $Q_1$ through $Q_8$. MUX 138 selectively passes one bit at its data inputs to its data output $Z_B$, and from there to the flip-flop 142. The flip-flop 142 then stores and provides the predicted parity bit $QP_2$ for the last eight data bits $Q_9$ through $Q_{16}$.

In operation, the circuitry enclosed in broken lines 118 provides predicted parity bits having values as summarized in Table I for the COUNT UP and COUNT DOWN functions. It should be appreciated that for either one of the COUNT UP or COUNT DOWN functions, the values at each of the data inputs $I_0$ through $I_{15}$ of MUX 110, MUX 112, MUX 114 or MUX 116 will be at a predetermined binary value of either "1" or "0". The values of $Q_1$-$Q_4$, $Q_5$-$Q_8$, $Q_9$-$Q_{12}$, and $Q_{13}$-$Q_{16}$ are presented to the control inputs $S_0$, $S_1$, $S_2$ and $S_3$ of the MUX's 110, 112, 114 and 116 and will cause the binary value at the one selected input of each of the MUX's 110 and 114 to appear at their output Z and to eventually be compared with the previous parity bits $QP_1$ and $QP_2$ at gates 132 and 134. The resulting predicted parity bits are passed to inputs $A_4$ and $A_7$ of MUX 136 and to inputs $B_4$ and $B_7$ of MUX 138 and appear at the outputs of flip-flops 140 and 142 as predicted parity bits $QP_1$ and $QP_2$.

The following Tables IIA and IIIA illustrate in greater detail the calculation of the new predicted parity bit $QP_1$ for the COUNT UP and COUNT DOWN functions. In particular, Tables IIA and IIIA show, for values of $Q_1$, $Q_2$, $Q_3$ and $Q_4$, and $Q_5$, $Q_6$, $Q_7$ and $Q_8$, whether the previous parity is changed or remains the same in order to calculate the new predicted parity bit. The following Tables IIB and IIIB show the actual signals presented to the inputs of MUX 110 and MUX 112 in order to implement the calculation as illustrated in Tables IIA and IIIA.

TABLE IIA

| | | | | PREVIOUS PREDICTED PARITY FOR | TO ARRIVE AT NEW PREDICTED PARITY FOR NEXT COUNT | |
|---|---|---|---|---|---|---|
| $Q_4$ | $Q_3$ | $Q_2$ | $Q_1$ | PRESENT COUNT | COUNT UP | COUNT DOWN |
| 0 | 0 | 0 | 0 | 1 | CHANGE | DETERMINED BY VALUES OF $Q_5$, $Q_6$, $Q_7$, $Q_8$- SEE TABLE IIIA. |
| 0 | 0 | 0 | 1 | 0 | SAME | CHANGE |
| 0 | 0 | 1 | 0 | 0 | CHANGE | SAME |
| 0 | 0 | 1 | 1 | 1 | CHANGE | CHANGE |
| 0 | 1 | 0 | 0 | 0 | CHANGE | CHANGE |
| 0 | 1 | 0 | 1 | 1 | SAME | CHANGE |
| 0 | 1 | 1 | 0 | 1 | CHANGE | SAME |
| 0 | 1 | 1 | 1 | 0 | SAME | CHANGE |
| 1 | 0 | 0 | 0 | 0 | CHANGE | SAME |
| 1 | 0 | 0 | 1 | 1 | SAME | CHANGE |
| 1 | 0 | 1 | 0 | 1 | CHANGE | SAME |
| 1 | 0 | 1 | 1 | 0 | CHANGE | CHANGE |
| 1 | 1 | 0 | 0 | 1 | CHANGE | CHANGE |
| 1 | 1 | 0 | 1 | 0 | SAME | CHANGE |
| 1 | 1 | 1 | 0 | 0 | CHANGE | SAME |
| 1 | 1 | 1 | 1 | 1 | DETERMINED BY VALUES OF $Q_5$, $Q_6$, $Q_7$, $Q_8$- SEE TABLE IIIA | CHANGE |

TABLE IIB

| MUX 110 INPUT | SIGNAL AT MUX 110 INPUT | VALUE OF SIGNAL AT MUX 110 INPUT | |
|---|---|---|---|
| | | COUNT UP | COUNT DOWN |
| $I_0$ | OUTPUT OF GATE 122 | 0 | OUTPUT OF MUX 112 INVERTED |
| $I_1$ | CU | 1 | 0 |
| $I_2$ | CD | 0 | 1 |
| $I_3$ | 0 | 0 | 0 |
| $I_4$ | 0 | 0 | 0 |
| $I_5$ | CU | 1 | 0 |
| $I_6$ | CD | 0 | 1 |
| $I_7$ | CU | 1 | 0 |
| $I_8$ | CD | 0 | 1 |
| $I_9$ | CU | 1 | 0 |
| $I_{10}$ | CD | 0 | 1 |
| $I_{11}$ | 0 | 0 | 0 |
| $I_{12}$ | 0 | 0 | 0 |
| $I_{13}$ | CU | 1 | 0 |
| $I_{14}$ | CD | 0 | 1 |
| $I_{15}$ | OUTPUT OF GATE 124 | OUTPUT OF MUX 112 INVERTED | 0 |

TABLE IIIA

| $Q_8 Q_7 Q_6 Q_5$ | PREVIOUS PREDICTED PARITY FOR PRESENT COUNT | TO ARRIVE AT NEW PREDICTED PARITY FOR NEXT COUNT | |
|---|---|---|---|
| | | COUNT UP | COUNT DOWN |
| 0 0 0 0 | 1 | CHANGE | SAME |
| 0 0 0 1 | 0 | SAME | CHANGE |
| 0 0 1 0 | 0 | CHANGE | SAME |
| 0 0 1 1 | 1 | CHANGE | CHANGE |
| 0 1 0 0 | 0 | CHANGE | CHANGE |
| 0 1 0 1 | 1 | SAME | CHANGE |
| 0 1 1 0 | 1 | CHANGE | SAME |
| 0 1 1 1 | 0 | SAME | CHANGE |
| 1 0 0 0 | 0 | CHANGE | SAME |
| 1 0 0 1 | 1 | SAME | CHANGE |
| 1 0 1 0 | 1 | CHANGE | SAME |
| 1 0 1 1 | 0 | CHANGE | CHANGE |
| 1 1 0 0 | 1 | CHANGE | CHANGE |
| 1 1 0 1 | 0 | SAME | CHANGE |
| 1 1 1 0 | 0 | CHANGE | SAME |
| 1 1 1 1 | 1 | SAME | CHANGE |

TABLE IIIB

| MUX 112 INPUT | SIGNAL AT MUX 112 INPUT | VALUE OF SIGNAL AT MUX 112 INPUT | |
|---|---|---|---|
| | | COUNT UP | COUNT DOWN |
| $I_0$ | CU | 1 | 0 |
| $I_1$ | CD | 0 | 1 |
| $I_2$ | CU | 1 | 0 |
| $I_3$ | "1" | 1 | 1 |
| $I_4$ | "1" | 1 | 1 |
| $I_5$ | CD | 0 | 1 |
| $I_6$ | CU | 1 | 0 |
| $I_7$ | CD | 0 | 1 |
| $I_8$ | CU | 1 | 0 |
| $I_9$ | CD | 0 | 1 |
| $I_{10}$ | CU | 1 | 0 |
| $I_{11}$ | "1" | 1 | 1 |
| $I_{12}$ | "1" | 1 | 1 |
| $I_{13}$ | CD | 0 | 1 |
| $I_{14}$ | CU | 1 | 0 |
| $I_{15}$ | CD | 0 | 1 |

It can be observed from Table IIA that the value of $QP_1$ is affected by bits $Q_5, Q_6, Q_7, Q_8$ only when $Q_1, Q_2, Q_3, Q_4$ are all 1's during the COUNT UP function and when they are all 0's during the COUNT DOWN function. As can be observed from Tables IIB and IIIB, the previous parity bit is changed in order to obtain the new predicted parity bit by a "0" at the output of MUX 110.

Although not described in detail or in tabular form, MUX 114 and MUX 116 are similar in operation to MUX 110 and MUX 112 in calculating the predicted parity bit $QP_2$ for the bits $Q_{17}-Q_{32}$. However, in order to consider the value of bits $Q_1-Q_{16}$ when $Q_9-Q_{12}$ are all 0's or all 1's, gates 126 and 128 each have one input connected to the output TC of register 104, as previously mentioned.

SHIFT UP/SHIFT DOWN FUNCTIONS

The circuitry associated with the SHIFT UP and SHIFT DOWN functions (represented by circuits 74 and 76 in FIG. 3) includes a pair of EXCLUSIVE OR gates 146 and 148 (FIG. 4E) associated with parity bit $QP_1$, and a pair of EXCLUSIVE OR gates 150 and 152 (FIG. 4F) associated with parity bit $QP_2$.

The EXCLUSIVE OR gate 146 receives and compares the data bit (SHIFTINUP) being shifted into register 102 at the input CET and the bit $C_1$ being shifted out of the register 104 at its carry output TC when the SHIFT UP function is being performed. The EXCLUSIVE OR gate 148 compares the data bit being shifted into register 104 at the input D and the bit to be shifted out of the register 102 at the data output $Q_1$ when the SHIFT DOWN function is being performed. The EXCLUSIVE OR gates 150 and 152 perform similar functions for registers 106 and 108. The output of EXCLUSIVE OR gate 146 is provided to an EXCLUSIVE OR gate 154 along with the previous predicted parity $QP_1$ from the output of flip-flop 140, and the output of EXCLUSIVE OR gate 148 is provided to an EXCLUSIVE OR gate 156 along with the previous predicted parity $QP_1$. In the same fashion, the output of gates 150 and 152 are provided to EXCLUSIVE OR gates 158 and 160 along with the previous predicted parity $QP_2$ from flip-flop 142.

The EXCLUSIVE OR gates 146, 148, 150, 152, 154, 156, 158 and 160 thus perform the operations necessary to provide predicted parity bit values summarized in Table I for the SHIFT UP and SHIFT DOWN functions, by comparing the bits being shifted in and the bits being shifted out of the registers. The outputs of the EXCLUSIVE OR gates 154 and 156, are provided to the inputs $A_3$ and $A_2$, respectively, of MUX 136 (FIG. 4E), and the outputs of the EXCLUSIVE OR gates 158 and 160 are provided to the inputs $B_3$ and $B_2$, respectively, of the MUX 138 (FIG. 4F). When the control signals $F_0$, $F_1$ and $F_2$ indicate the SHIFT UP or SHIFT DOWN functions, the MUX's 136 and 138 pass the predicted parity bits to their outputs $Z_A$ and $Z_B$ and, in turn, to the flip-flops 140 and 142, which provide the predicted parity bits $QP_1$ and $QP_2$.

LOAD, COMPLEMENT, HOLD AND CLEAR FUNCTIONS

There is also shown in FIGS. 4A through 4F the circuitry associated with the LOAD, COMPLEMENT, HOLD and CLEAR functions, corresponding to the parity prediction circuits 78, 80, 82 and 84 of FIG. 3.

For the LOAD function, the parity bits $DP_1$ and $DP_2$ associated with the data bits $D_1$ through $D_{16}$ are merely provided as the predicted parity bits $QP_1$ and $QP_2$. Accordingly, the parity bit $DP_1$ is provided directly to the input $A_0$ of MUX 136 and the parity bit $DP_2$ is provided directly to the input $B_0$ of MUX 138. When the control signals $F_0$, $F_1$ and $F_2$ indicate a load function is to be performed, the parity bits $DP_1$ and $DP_2$ are passed through MUX's 136 and 138 and appear as the predicted parity bits $QP_1$ and $QP_2$ at the outputs of flip-flops 140 and 142.

For the COMPLEMENT and HOLD functions, the previous predicted parity will be the new predicted parity and, as a consequence, the output of flip-flop 140 is provided to the $A_1$ and $A_7$ inputs of multiplexer 136 and the output of flip-flop 142 is provided to the $B_1$ and $B_7$ inputs of MUX 138. Control signals $F_0$, $F_1$ and $F_2$ will cause MUX 136 and MUX 138 to pass the previous predicted parity bits back through the flip-flops 140 and 142 when a COMPLEMENT or HOLD function is performed.

For the CLEAR function, the predicted parity will always be "1" and, accordingly, the logic level "1" on voltage supply line 131 is provided to inputs $A_5$ and $B_5$ of MUX's 136 and 138. The control signals $F_0$, $F_1$ and $F_2$ cause the "1" to appear as the predicted parity bits $QP_1$ and $QP_2$ when a CLEAR function is performed.

It can be seen from the foregoing description that the registers 102, 104, 106 and 108 of FIGS. 4A through 4F are combined or cascaded to form a sixteen-bit, eight-function register, and that the remaining circuitry shown in FIGS. 4A through 4F is used to provide predicted parity bits for each of the eight functions. In particular, MUX 136 and MUX 138 select, in accordance with the control signals $F_0$, $F_1$ and $F_2$, the circuits associated with each of the eight functions that are to provide the predicted parity bits. Furthermore, the prediction of the parity bits associated with the output bits $Q_1$ through $Q_{16}$ during the COUNT UP and COUNT DOWN functions is simplified by the use of the MUX's 110, 112, 114 and 116, which have bits of predetermined binary values at each of their inputs and which select one bit for determining the new predicted parity at each count during the performance of the functions.

Although the presently preferred embodiment of this invention has been described, it will be understood that within the purview of this invention various changes may be made within the scope of the appended claims.

What is claimed is:

1. In a data processing system, the combination of:

a register for storing data and operating on the data in accordance with any one of a plurality of predetermined functions, said register having control input means for receiving control signals and in response selecting one of the functions; and parity prediction circuitry connected to said register for predicting the parity of the data stored in said register, said parity prediction circuitry comprising:

a plurality of circuit means, with one of said circuit means associated with each function for predicting the parity of the data when said register operates on the data in accordance with that function; and selecting means connected for receiving the control signals received at said control input means of said register and in response selecting the one of said circuit means associated with the function selected by said control input means to provide its predicted parity.

2. The data processing system of claim 1, wherein said selecting means comprises a multiplexer having an output for providing the predicted parity of the data and a plurality of inputs, each input for receiving the output of one of said circuit means.

3. The data processing system of claim 2, wherein one of said circuit means is associated with a function in accordance with which said register operates as a counter, and wherein that one of said circuit means comprises a multiplexer having control inputs, data inputs, and a data output, with the control inputs connected to receive the data stored in said register and with each of the data inputs connected to receive a signal having either a logic "1" or a logic "0", so that the data output of said multiplexer provides a parity changing signal indicating whether the predicted parity is changed from a previous parity, with the value of the parity changing signal selected on the basis of the data stored in said register.

4. The data processing system of claim 2, wherein one of said circuit means is associated with a function in accordance with which said register operates as a shift register, and wherein that one of said circuit means includes means for comparing the data bit shifted into said register with the data bit shifted out of said register and means for changing a previous parity to obtain the predicted parity if the shifted in and shifted out data bits are not the same.

5. The data processing system of claim 2, wherein one of said circuit means is associated with a function in accordance with which said register is cleared, and wherein that one of said circuit means includes means for providing a signal having a predetermined logic level to one of the inputs of said selecting means so that when the control signals indicate that said register is to be cleared, the predicted parity is at the predetermined logic level provided by that one of said circuit means.

6. The data processing system of claim 2, wherein one of said circuit means is associated with a function in accordance with which the data in said register is complemented, that one of said circuit means including means for presenting a previous parity to one of the inputs of said selecting means.

7. Circuitry for predicting parity for a multifunction register having control inputs for receiving control signals that select the function of said register, said circuitry comprising:

a parity prediction circuit associated with each function performed by said register and having an output for providing a predicted parity for that function; and a multiplexer having a plurality of data inputs, each of the data inputs for receiving the predicted parity from the output of one said parity prediction circuit, and control inputs for receiving the control signals that select the function of said register, and a data output for providing the predicted parity selected from one of the data inputs in response to the control signals.

8. In a data processing system having a register for performing any selected one of a plurality of functions such as COUNT, SHIFT, LOAD, and COMPLEMENT, prediction circuitry for predicting the parity for the data stored in said register, comprising:

circuit means associated with each function for providing predicted parity of the data stored in aid register when that function is performed; and selecting means connected for receiving control signals that select the function of said register and in response providing the predicted parity by selecting said circuit means associated with the selected one of the functions to provide its predicted parity.

9. In a data processing system having a register for storing data and operating as a binary counter and having prediction circuitry for predicting the parity of the next count of the register, the improvement wherein said prediction circuitry comprises:

a multiplexer having control inputs connected to receive the data stored in said register, data inputs, and a data output, each data input connected to receive a signal at a predetermined logic level, so that in response to the data stored in said register said multiplexer passes one of the signals at its data inputs to its data output as a parity predicting signal.

10. The data processing system of claim 9, wherein said register performs either a count up or count down function, wherein said register receives a control signal controlling the function performed by said register, and including gate means for receving said control signal and having an inverted output and a non-inverted output for providing signals at the data inputs of said multiplexer.

11. The data processing system of claim 9, wherein the parity predicting signal at the data output of said multiplexer has one logic level indicating that the predicted parity is to be changed from the previous parity and another logic level indicating that the predicted parity is the same as the previous parity, and further including gate means for receiving the parity predicting signal and the previous parity, and in response providing the predicted parity of the next count of said register.

* * * * *